(12) United States Patent
Zhang et al.

(10) Patent No.: US 11,543,548 B2
(45) Date of Patent: Jan. 3, 2023

(54) MECHANICAL-MODEL BASED EARTHQUAKE-INDUCED LANDSLIDE HAZARD ASSESSMENT METHOD IN EARTHQUAKE-PRONE MOUNTAINOUS AREA

(71) Applicant: Southwest Jiaotong University, Chengdu (CN)

(72) Inventors: Yingbin Zhang, Chengdu (CN); Jing Liu, Chengdu (CN); Haiying Fu, Chengdu (CN); Qingdong Wang, Chengdu (CN); Chenlin Xiang, Chengdu (CN); Dejian Li, Chengdu (CN); Jiangtao Wei, Chengdu (CN); Yin Cheng, Chengdu (CN); Zhiwang Chang, Chengdu (CN); Pengcheng Yu, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 288 days.

(21) Appl. No.: 16/939,082

(22) Filed: Jul. 27, 2020

(65) Prior Publication Data
US 2021/0026027 A1    Jan. 28, 2021

(30) Foreign Application Priority Data
Jul. 25, 2019    (CN) .......................... 201910676848.9

(51) Int. Cl.
*G01V 1/28*        (2006.01)
*G06F 16/29*       (2019.01)
(Continued)

(52) U.S. Cl.
CPC .............. *G01V 1/288* (2013.01); *G01V 1/008* (2013.01); *G06F 16/29* (2019.01); *G06T 17/05* (2013.01);
(Continued)

(58) Field of Classification Search
CPC ....................................................... G01V 1/201
See application file for complete search history.

(56) References Cited

U.S. PATENT DOCUMENTS

2019/0250291 A1* 8/2019 Sun ........................ G01V 1/288

OTHER PUBLICATIONS

Song J, Rodriguez-Marek A. Sliding displacement of flexible earth slopes subject to near-fault ground motions. Journal of Geotechnical and Geoenvironmental Engineering. Mar. 1, 2015;141(3):04014110. (Year: 2015).*

(Continued)

*Primary Examiner* — Clifford Hilaire
(74) *Attorney, Agent, or Firm* — Bayramoglu Law Offices LLC

(57) ABSTRACT

A mechanical-model based earthquake-induced landslide hazard assessment method in earthquake-prone mountainous area includes: obtaining the cohesion and internal friction angle through a geological map of the study area and a geotechnical physical parameter; obtaining simulated ground motions by combining a pulse-like ground motion effect model and a pulse-like ground motion response model; calculating slope permanent displacement according to the simulated ground motions, the cohesion, the internal friction angle and other parameters; obtaining a statistical relationship between the permanent displacement and a landslide probability according to permanent displacement data derived from historical earthquake-induced landslides and historical strong earthquake records; and predicting earthquake-induced landslide probability according to the slope permanent displacement and the statistical relationship between the permanent displacement and the landslide probability, and quantitatively evaluating earthquake-induced landslide hazard through the earthquake-induced landslide probability.

8 Claims, 6 Drawing Sheets

(51) Int. Cl.
  *G01V 1/00* (2006.01)
  *G06T 17/05* (2011.01)
(52) U.S. Cl.
  CPC .............. *G01V 2210/1232* (2013.01); *G01V 2210/1425* (2013.01)

(56) References Cited

OTHER PUBLICATIONS

Refice, Alberto, and Domenico Capolongo. "Probabilistic modeling of uncertainties in earthquake-induced landslide hazard assessment." Computers & Geosciences 28, No. 6 (2002): 735-749 (Year: 2002).*

Zhang YB, Xiang CL, Chen YL, Cheng QG, Xiao L, Yu PC, Chang ZW. Permanent displacement models of earthquake-induced landslides considering near-fault pulse-like ground motions. Journal of Mountain Science. Jun. 2019;16(6):1244-57. (Year: 2019).*

Zhang, Y., L. Zheng, and H. Xing. "Does the Vertical Component of Seismic Loading Have No Discernible Effect on Permanent Displacement of Sliding System?." (2014). (Year: 2014).*

Pang R, Xu B, Kong X, Zhou Y, Zou D. Seismic performance evaluation of high CFRD slopes subjected to near-fault ground motions based on generalized probability density evolution method. Engineering Geology. Nov. 28, 2018;246:391-401. (Year: 2018).*

Xu C, Xu X, Yao Q, Wang Y. GIS-based bivariate statistical modelling for earthquake-triggered landslides susceptibility mapping related to the 2008 Wenchuan earthquake, China. Quarterly Journal of Engineering Geology and Hydrogeology. May 1, 2013;46(2):221-36. (Year: 2013).*

* cited by examiner

MECHANICAL-MODEL BASED EARTHQUAKE-INDUCED LANDSLIDE HAZARD ASSESSMENT METHOD IN EARTHQUAKE-PRONE MOUNTAINOUS AREA

CROSS REFERENCE TO THE RELATED APPLICATIONS

This application is based upon and claims priority to Chinese Patent Application No. 201910676848.9, filed on Jul. 25, 2019, the entire contents of which are incorporated herein by reference.

TECHNICAL FIELD

The present invention relates to the technical field of earthquake-induced landslide hazard assessment, and more particularly, to a quantitative method for earthquake-induced landslide hazard assessment based on a mechanical model.

BACKGROUND

Earthquake-induced landslides are a secondary earthquake disaster and result in serious casualties and substantial property loss. China is located between the Pacific Seismic Belt and the Himalaya-Mediterranean Seismic Belt. Strong earthquakes are common as a result and some cause severely destructive earthquake-induced landslides. This is especially the case in complex mountainous areas that have high seismicity. There, geological disasters induced by earthquakes can be extremely severe. The Great Wenchuan earthquake, which occurred on May 12, 2008, for example, triggered a large number of landslide geological disasters and caused massive casualties. More than 1600 people lost their lives in the Wangjiayan landslide in old Beichuan County. Four villages were reported buried in the Donghekou landslide in Qingchuan County, and more than 700 people killed. Earthquake-induced geological disasters also damage railway infrastructure, lead to major safety accidents, like derailment and overturning of trains, cause damage to roads and bridges, hinder traffic and threaten lives and property. It is, therefore, highly desirable to provide a new mechanical-model based earthquake-induced landslide hazard assessment method in order to minimize the losses caused by earthquake-induced landslides.

The earthquake-induced landslide hazard assessment refers to analyzing spatial-temporal distribution probability of earthquake-induced landslides and providing hazard descriptive elements, such as the specific location, volume and the like, of the landslide under a potential earthquake. The earthquake-induced landslide hazard assessment method can be substantially divided into: (1) a probability analysis method based on landslide cataloging, (2) a qualitative analysis and reasoning method, (3) a semi-quantitative method using related mathematical models and (4) a deterministic method based on a mechanical model. The mechanical-model based earthquake-induced landslide hazard assessment method based on a mechanical model originated from the classical seismic slope stability analysis method. This method is practicable in practice and can form a simplified empirical model together with a geographic information system (GIS) after being transformed. Due to the late use of this method in China, however, this method currently relies on permanent displacement empirical models and displacement-probability models to perform hazard assessment. This method is based on historical seismic events and landslide samples and thus has extremely strong time discrepancy and geographical dependence.

SUMMARY

In view of the above-mentioned shortcomings in the prior art, the present invention provides a mechanical-model based earthquake-induced landslide hazard assessment method to solve the problem of inaccuracies common with the results of the earthquake-induced landslide hazard assessment.

In order to achieve the above-mentioned objective of the present invention, the present invention adopts the following technical solution. A mechanical-model based earthquake-induced landslide hazard assessment method in an earthquake-prone mountainous area includes the following steps:

A1, obtaining the cohesion and internal friction angle through the geological map of the study area and a geotechnical physical parameter;

A2, obtaining simulated ground motions by combining a pulse-like ground motion effect model and a pulse-like ground motion response model, wherein fault and seismic source are considered in the pulse-like ground motion effect model, and mountain terrain effect is considered in the pulse-like ground motion response model;

A3, calculating slope permanent displacement according to the simulated ground motions, the cohesion, the internal friction angle and other parameters;

A4, obtaining a statistical relationship between the permanent displacement and landslide probability according to permanent displacement data, wherein the permanent displacement data is derived from historical earthquake-induced landslides and historical strong earthquake records; and A5, predicting earthquake-induced landslide probability according to the slope permanent displacement and the statistical relationship between the permanent displacement and the landslide probability, and quantitatively evaluating earthquake-induced landslide hazard through the earthquake-induced landslide probability.

The advantages of the present invention are as follows. In the present invention, considerations can be effectively given to the distribution law of the earthquake-induced landslide, such as a series of factors of near-fault distribution, dominant direction distribution of ground motion pulses and ground motion attenuation, to perform the more accurate assessment on the landslide hazard. Additionally, a seismogenic fault and an earthquake magnitude can be set to generate ground motion as a vibration input according to earthquake zoning in consideration of the seismogenic fault and geological information, etc., to calculate a permanent displacement value, obtain hazard quantitative assessment of the landslide induced by a potential earthquake or a hypothetical earthquake in combination with a probability-displacement relationship, and divide hazardous areas. The present invention can be used for the research on potential earthquake-induced landslide areas near the faults and preforms landslide hazard assessment through simulated earthquake information to determine a landslide hazardous area, thereby performing disaster prevention in advance and providing a site selection basis for building houses, roads, railways and so on. The present invention can also be applied to landslide disaster assessment after an earthquake to determine high-hazard areas, medium-hazard areas and low-hazard areas of the landslide to carry out disaster relief quickly and accurately.

DETAILED DESCRIPTION OF THE EMBODIMENTS

The specific embodiments of the present invention are described hereinafter to facilitate skilled artisans' understanding of the present invention. However, it should be noted that the present invention is not limited to the scope of the specific embodiments. For those having ordinary skill in the art, if various changes are made within the spirit and scope of the present invention defined by the appended claims, these changes are obvious, and all inventions using the concept of the present invention are protected within the scope of the present invention.

Figure 1:
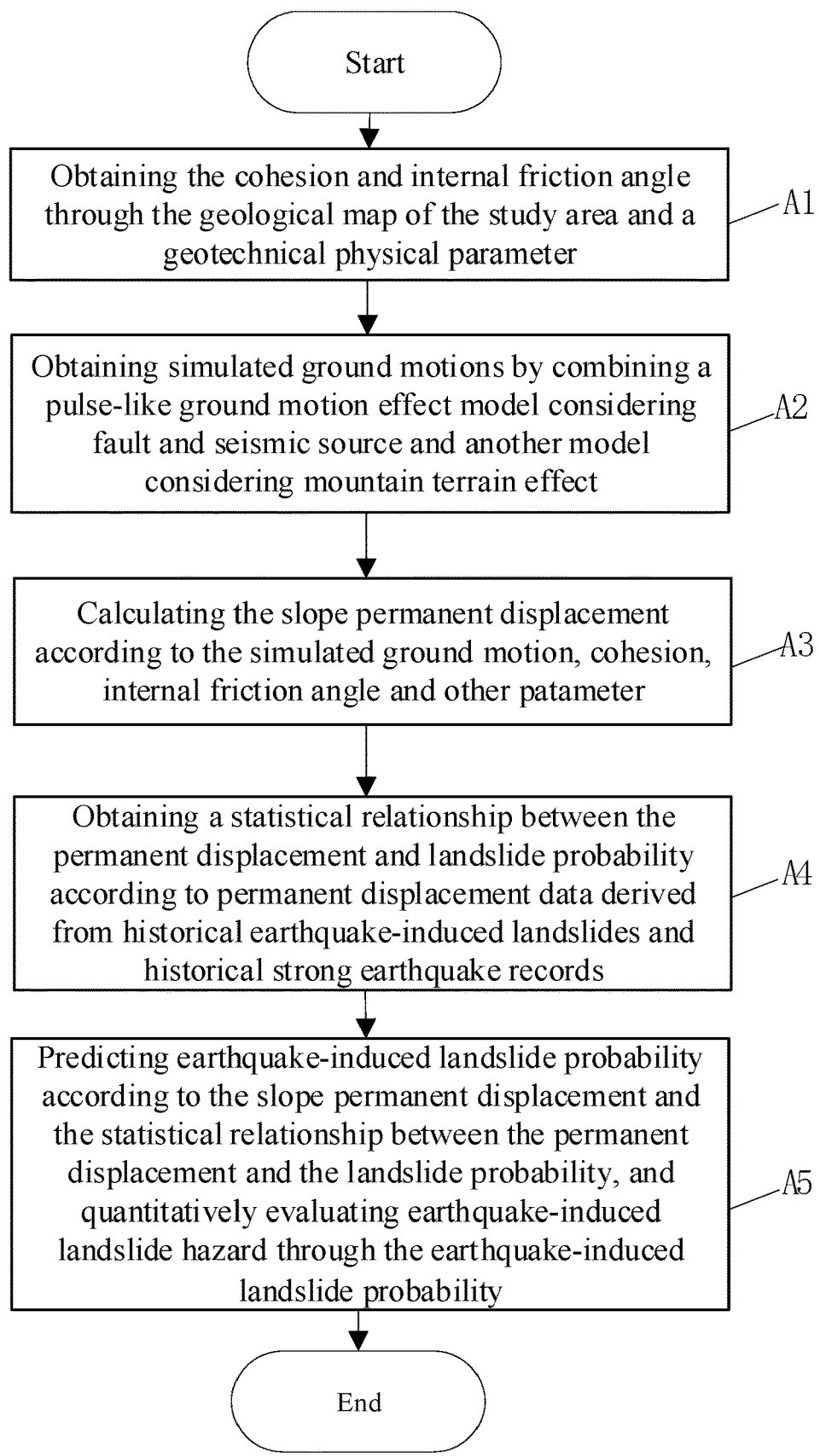
FIG. 1 is a flow chart of the present invention.

As shown in FIG. 1, a mechanical-model based earthquake-induced landslide hazard assessment method in an earthquake-prone mountainous area includes the following steps:

A1: The cohesion and the internal friction angle are obtained through the geological map of the study area and a geotechnical physical parameter.

A2: The simulated ground motion are obtained by combining a pulse-like ground motion effect model and a pulse-like ground motion response model, wherein fault and seismic source are considered in the pulse-like ground motion effect model, and mountain terrain effect is considered in the pulse-like ground motion response model.

A3: Slope permanent displacement is calculated according to the simulated ground motions, the cohesion, the internal friction angle and other parameters.

Initial data including a high-precision digital elevation map (DEM), a water system distribution map, a geological map and the like in a research area are collected. A slope gradient map, a slope aspect map, a water level map and other maps are generated using a geographic information system (GIS).

Figure 2:
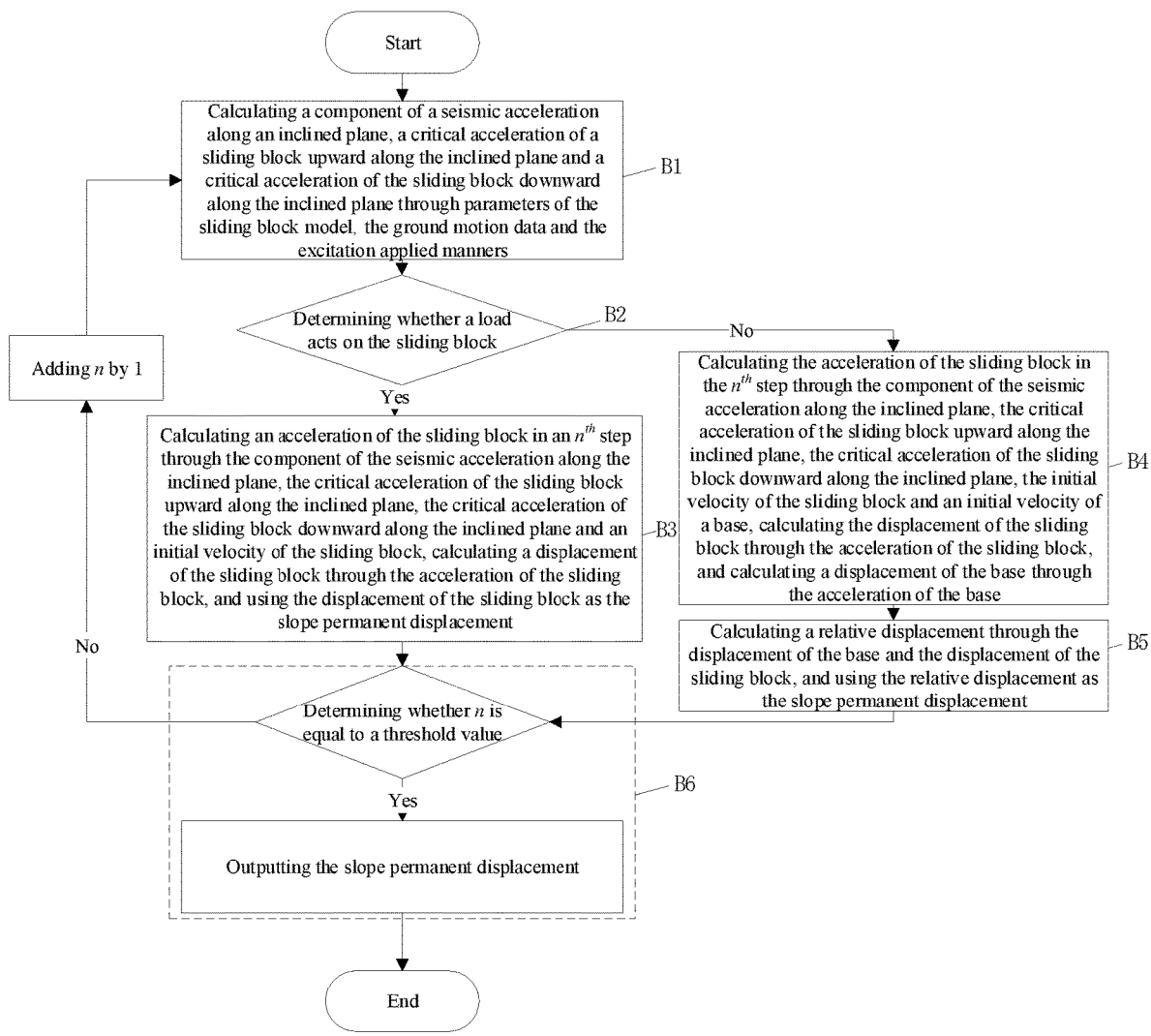
FIG. 2 is a flow chart of calculating the slope permanent displacement in the present invention.

As shown in FIG. 2, a method of calculating the slope permanent displacement specifically includes:

B1: A component of a seismic acceleration along an inclined plane, a critical acceleration of a sliding block upward along the inclined plane and a critical acceleration of the sliding block downward along the inclined plane are calculated through parameters of the sliding block model, the ground motion data and excitation applied manners.

The excitation applied manners includes a load acting part, a slope direction and a ground motion coupling mode.

When the load acting part is a base, the critical acceleration of the sliding block upward along the inclined plane is calculated by the following formula:

$$a_{c\text{-}up}(n) = \left\{\frac{cl}{m} + \tan\varphi[g\cos\alpha + a_y(n)]\right\} + g\sin\alpha;$$

when the load acting part is the sliding block, the critical acceleration of the sliding block upward along the inclined plane is calculated by the following formula:

$$a_{c\text{-}up}(n) = -\left\{\frac{cl}{m} + \tan\varphi[g\cos\alpha - a_y(n)]\right\} - g\sin\alpha;$$

when the load acting part is the base, the critical acceleration of the sliding block downward along the inclined plane is calculated by the following formula:

$$a_{c\text{-}down}(n) = -\left\{\frac{cl}{m} + \tan\varphi[g\cos\alpha + a_y(n)]\right\} + g\sin\alpha;$$

when the load acting part is the sliding block, the critical acceleration of the sliding block downward along the inclined plane is calculated by the following formula:

$$a_{c\text{-}down}(n) = \left\{\frac{cl}{m} + \tan\varphi[g\cos\alpha - a_y(n)]\right\} - g\sin\alpha;$$

where, $a_{c\text{-}up}(n)$ represents the critical acceleration of the sliding block upward along the inclined plane, $a_{c\text{-}down}(n)$ represents the critical acceleration of the sliding block downward along the inclined plane, c represents the cohesion, l represents a length of the sliding block, m represents a mass of the sliding block, $\varphi$ represents a friction angle, g represents a gravitational acceleration, $\alpha$ represents a slope angle, and $a_y(n)$ represents a component of the ground motion perpendicular to a direction of the inclined plane.

B2: It is determined that whether the load acts on the sliding block, proceeding to step B3 if yes, otherwise proceeding to step B4.

B3: An acceleration of the sliding block in the $n^{th}$ step is calculated through the component of the seismic acceleration along the inclined plane, the critical acceleration of the sliding block upward along the inclined plane, the critical acceleration of the sliding block downward along the inclined plane and an initial velocity of the sliding block. A displacement of the sliding block is calculated through the acceleration of the sliding block. The displacement of the sliding block is used as the slope permanent displacement, and proceeding to step B6.

An initial value of n is set as 1.

Figure 3:
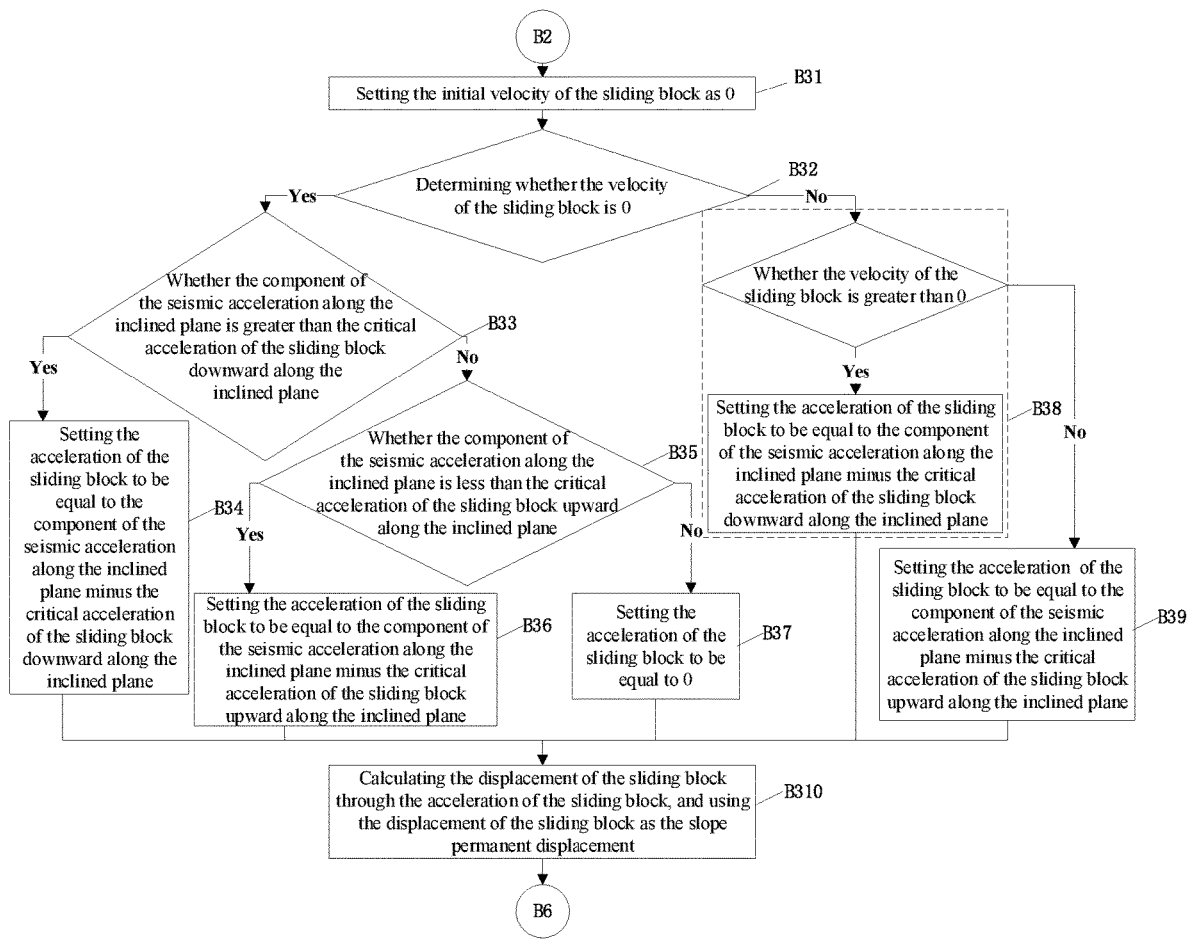
FIG. 3 is a specific flow chart of step B3 in the present invention.

As shown in FIG. 3, step B3 specifically includes:

B31: The initial velocity $v_{(S)(0)}$ of the sliding block is set as 0.

B32: It is determined that whether a velocity $v_{(S)(n-1)}$ of the sliding block is 0, proceeding to step B33 if yes, otherwise, proceeding to step B38.

B33: It is determined that whether the component $a_{para(n)}$ of the seismic acceleration along the inclined plane is greater than the critical acceleration $a_{c\text{-}down(n)}$ of the sliding block downward along the inclined plane, proceeding to step B34 if yes, otherwise, proceeding to step B35.

B34: The acceleration $a_{(S)(n)}$ of the sliding block is set to be equal to the component $a_{para(n)}$ of the seismic acceleration along the inclined plane minus the critical acceleration $a_{c\text{-}down(n)}$ of the sliding block downward along the inclined plane, and proceeding to step B310.

B35: It is determined that whether the component $a_{para(n)}$ of the seismic acceleration along the inclined plane is less than the critical acceleration $a_{c\text{-}up(n)}$ of the sliding block upward along the inclined plane, proceeding to step B36 if yes, otherwise, proceeding to step B37.

B36: The acceleration $a_{(S)(n)}$ of the sliding block is set to be equal to the component $a_{para(n)}$ of the seismic acceleration along the inclined plane minus the critical acceleration $a_{c\text{-}up(n)}$ of the sliding block upward along the inclined plane, and proceeding to step B310.

B37: The acceleration $a_{(S)(n)}$ of the sliding block is set to be equal to 0, and proceeding to step B310.

B38: It is determined that whether the velocity $v_{(S)(n-1)}$ of the sliding block is greater than 0, if yes, the acceleration $a_{(S)(n)}$ of the sliding block is set to be equal to the component $a_{para(n)}$ of the seismic acceleration along the inclined plane minus the critical acceleration $a_{c\text{-}down(n)}$ of the sliding block downward along the inclined plane, and proceeding to step B310, otherwise, proceeding to step B39.

B39: The acceleration $a_{(S)(n)}$ of the sliding block is set to be equal to the component $a_{para(n)}$ of the seismic acceleration along the inclined plane minus the critical acceleration $a_{c\text{-}up(n)}$ of the sliding block upward along the inclined plane, and proceeding to step B310.

B310: The displacement $d_{(S)(n)}$ of the sliding block is calculated through the acceleration $a_{(S)(n)}$ of the sliding block, and the displacement $d_{(S)(n)}$ of the sliding block is used as the slope permanent displacement.

The displacement $d_{(S)(n)}$ of the sliding block is calculated by the following formula:

$$d_{(S)(n)} = d_{(S)(n-1)} + v_{(S)(n-1)} * \Delta t + \tfrac{1}{2} a_{(S)(n)}^2 * \Delta t;$$

where, $d_{(S)(n-1)}$ represents a displacement of the sliding block in the $(n-1)^{th}$ step, $v_{(S)(n-1)}$ represents a velocity of the sliding block in the $(n-1)^{th}$ step, and $\Delta t$ represents a time interval.

The velocity $v_{(S)(n-1)}$ of the sliding block in the $(n-1)^{th}$ step is calculated by the following formula:

$$v_{(S)(n-1)} = v_{(S)(n-2)} + a_{(S)(n-1)} * \Delta t;$$

where, $v_{(S)(n-2)}$ represents a velocity of the sliding block in the $(n-2)^{th}$ step, and $a_{(S)(n-1)}$ represents an acceleration of the sliding block in the $(n-1)^{th}$ step.

B4: The acceleration of the sliding block in the $n^{th}$ step is calculated through the component of the seismic acceleration along the inclined plane, the critical acceleration of the sliding block upward along the inclined plane, the critical acceleration of the sliding block downward along the inclined plane, the initial velocity of the sliding block and the initial velocity of the base. The displacement of the sliding block is calculated through the acceleration of the sliding block, the displacement of the base is calculated through the acceleration of the base, and proceeding to step B5.

Figure 4:
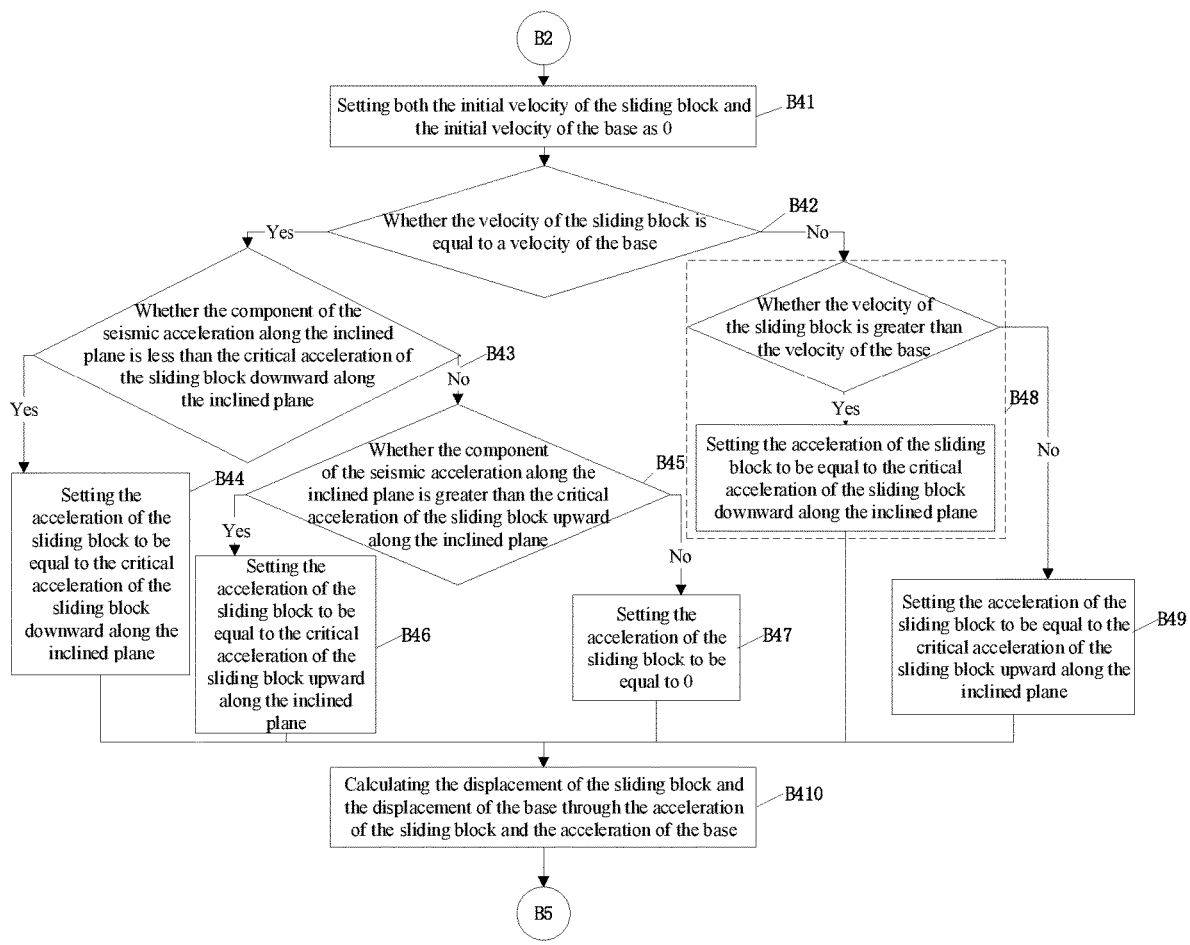
FIG. 4 is a specific flow chart of step B4 in the present invention.

As shown in FIG. 4, step B4 specifically includes:

B41: Both the initial velocity $v_{(S)(0)}$ of the sliding block and the initial velocity $v_{(B)(0)}$ of the base are set as 0.

B42: It is determined that whether the velocity $v_{(S)(n-1)}$ of the sliding block is equal to the velocity $v_{(B)(n-1)}$ of the base, proceeding to step B43 if yes, otherwise, proceeding to step B48.

B43: It is determined that whether the component $a_{para(n)}$ of the seismic acceleration along the inclined plane is less than the critical acceleration $a_{c\text{-}down(n)}$ of the sliding block downward along the inclined plane, proceeding to step B44 if yes, otherwise, proceeding to step B45.

B44: The acceleration $a_{(S)(n)}$ of the sliding block is set to be equal to the critical acceleration $a_{c\text{-}down(n)}$ of the sliding block downward along the inclined plane, and proceeding to step B410.

B45: It is determined that whether the component $a_{para(n)}$ of the seismic acceleration along the inclined plane is greater than the critical acceleration $a_{c\text{-}up(n)}$ of the sliding block upward along the inclined plane, proceeding to step B46 if yes, otherwise, proceeding to step B47.

B46: The acceleration $a_{(S)(n)}$ of the sliding block is set to be equal to the critical acceleration $a_{c\text{-}up(n)}$ of the sliding block upward along the inclined plane, and proceeding to step B410.

B47: The acceleration $a_{(S)(n)}$ of the sliding block is set to be equal to 0, and proceeding to step B410.

B48: It is determined that whether the velocity $v_{(S)(n-1)}$ of the sliding block is greater than the velocity $v_{(B)(n-1)}$ of the base, if yes, the acceleration $a_{(S)(n)}$ of the sliding block is set to be equal to the critical acceleration $a_{c\text{-}down(n)}$ of the sliding block downward along the inclined plane, and proceeding to step B410, otherwise, proceeding to step B49.

B49: The acceleration $a_{(S)(n)}$ of the sliding block is set to be equal to the critical acceleration $a_{c\text{-}up(n)}$ of the sliding block upward along the inclined plane, and proceeding to step B410.

B410: The displacement $d_{(S)(n)}$ of the sliding block and the displacement $d_{(B)(n)}$ of the base are calculated through the acceleration $a_{(S)(n)}$ of the sliding block and the acceleration $a_{(B)(n)}$ of the base.

The displacement $d_{(S)(n)}$ of the sliding block is calculated by the following formula:

$$d_{(S)(n)} = d_{(S)(n-1)} + v_{(S)(n-1)} * \Delta t + \tfrac{1}{2} a_{(S)(n)}^2 * \Delta t;$$

where, $d_{(S)(n-1)}$ represents the displacement of the sliding block in the $(n-1)^{th}$ step, $v_{(S)(n-1)}$ represents the velocity of the sliding block in the $(n-1)^{th}$ step, and $\Delta t$ represents a time interval.

The velocity $v_{(S)(n-1)}$ of the sliding block in the $(n-1)^{th}$ step is calculated by the following formula:

$$v_{(S)(n-1)} = v_{(S)(n-2)} + a_{(S)(n-1)} * \Delta t;$$

where, $v_{(S)(n-2)}$ represents the velocity of the sliding block in the $(n-2)^{th}$ step, and $a_{(S)(n-1)}$ represents the acceleration of the sliding block in the $(n-1)^{th}$ step.

The displacement $d_{(B)(n)}$ of the base is calculated by the following formula:

$$d_{(B)(n)} = d_{(B)(n-1)} + v_{(B)(n-1)} * \Delta t + \tfrac{1}{2} a_{(B)(n)}^2 * \Delta t;$$

where, $d_{(B)(n-1)}$ represents the displacement of the base in the $(n-1)^{th}$ step, and $v_{(B)(n-1)}$ represents the velocity of the base in the $(n-1)^{th}$ step.

The velocity $v_{(B)(n-1)}$ of the base in the $(n-1)^{th}$ step is calculated by the following formula:

$$v_{(B)(n-1)} = v_{(B)(n-2)} + a_{(B)(n-1)} * \Delta t;$$

where, $v_{(B)(n-2)}$ represents the velocity of the base in the $(n-2)^{th}$ step, and $a_{(B)(n-1)}$ represents the acceleration of the base in the $(n-1)^{th}$ step.

The acceleration $a_{(B)(n-1)}$ of the base in the $(n-1)^{th}$ step is calculated by the following formula:

$$a_{(B)(n-1)} = a_{(h)(n-1)};$$

where, $a_{(h)(n-1)}$ represents a component of horizontal ground motion in the $(n-1)^{th}$ step.

B5: A relative displacement is calculated through the displacement of the base and the displacement of the sliding block, the relative displacement is used as the slope permanent displacement, and proceeding to step B6.

B6: It is determined that whether n is equal to a threshold value, if yes, the slope permanent displacement is output, otherwise, returning and n is added by 1, and returning to the step B1.

Figure 5:
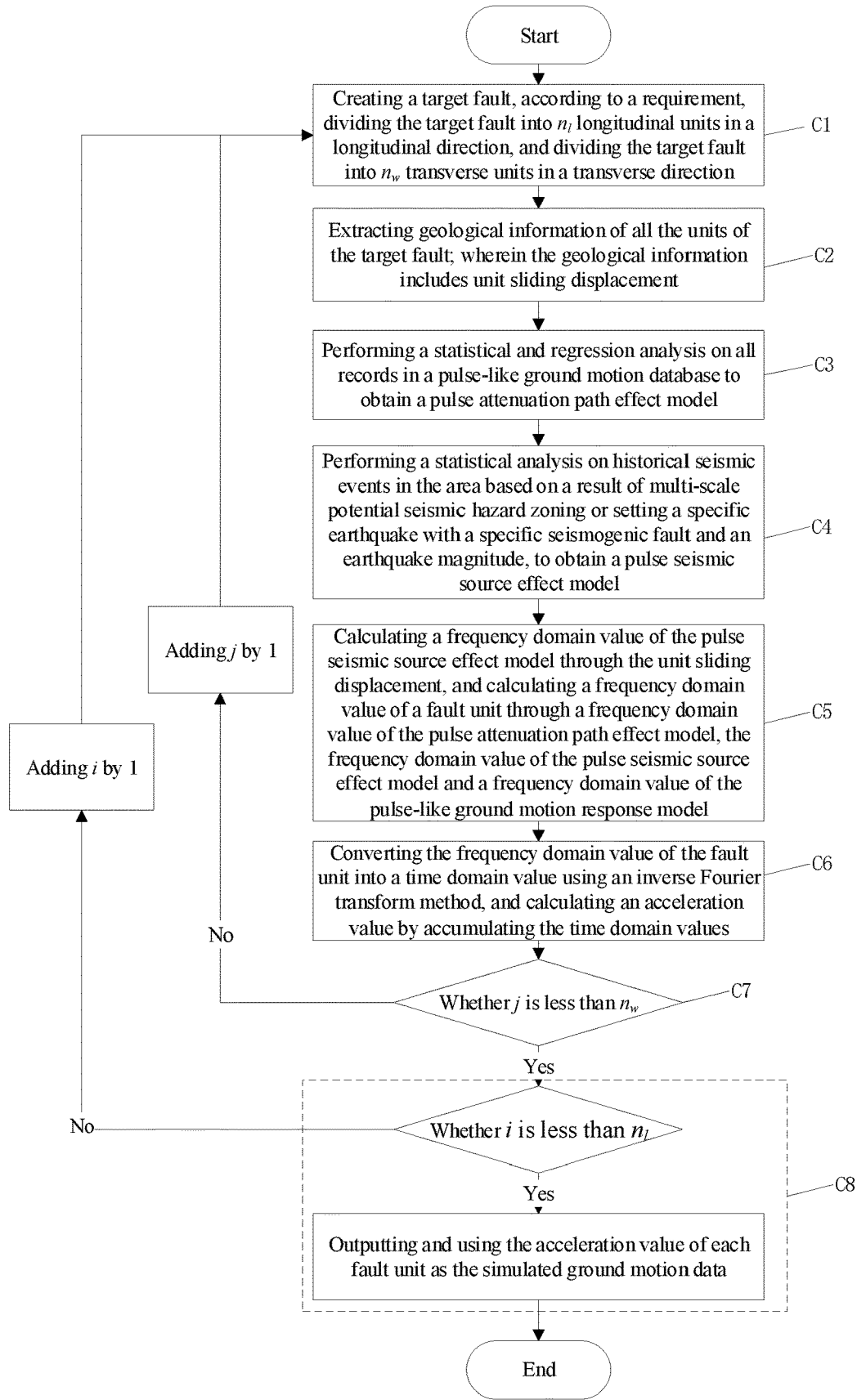
FIG. 5 is a flow chart of calculating the simulated ground motions in the present invention.

As shown in FIG. 5, the simulated ground motions are calculated by the following steps:

C1: A target fault is created. According to the requirements, the target fault is divided into $n_l$ longitudinal units in a longitudinal direction, and the target fault is divided into $n_w$ transverse units in a transverse direction, both the initial value of i and the initial value of j are set as 1, wherein i represents an ordinal number of the longitudinal unit, and j represents an ordinal number of the transverse unit.

C2: Geological information of all the units of the target fault is extracted, wherein the geological information includes unit sliding displacement.

C3: A statistical and regression analysis is performed on all records in a pulse-like ground motion database to obtain a pulse attenuation path effect model.

C4: A statistical analysis is performed on historical seismic events in the area based on a result of multi-scale potential seismic hazard zoning or setting a specific earthquake with a specific seismogenic fault and earthquake magnitude, to obtain a pulse seismic source effect model.

C5: A frequency domain value of the pulse seismic source effect model is calculated through the unit sliding displacement, and a frequency domain value of a fault unit is calculated through a frequency domain value of the pulse attenuation path effect model, the frequency domain value of the pulse seismic source effect model and a frequency domain value of the pulse-like ground motion response model.

The frequency domain value of the fault unit is calculated by the following formula:

$$A_{ij}(f)=A^L(f) \cdot A_{ij}^P(f) \cdot A_{ij}^s(f);$$

where, $A_{ij}(f)$ represents the frequency domain value of the fault unit, $A^L(f)$ represents the frequency domain value of the mountain terrain effect model, $A_{ij}^P(f)$ represents the frequency domain value of the pulse attenuation path effect model, and $A_{ij}^s(f)$ represents the frequency domain value of the pulse seismic source effect model.

The frequency domain value $A_{ij}^s(f)$ of the pulse seismic source effect model is calculated by the following formula:

$$A_{ij}^s(f)=k \cdot S_{ij};$$

where, K represents a coefficient, and $S_{ij}$ represents the unit sliding displacement.

Figure 6:
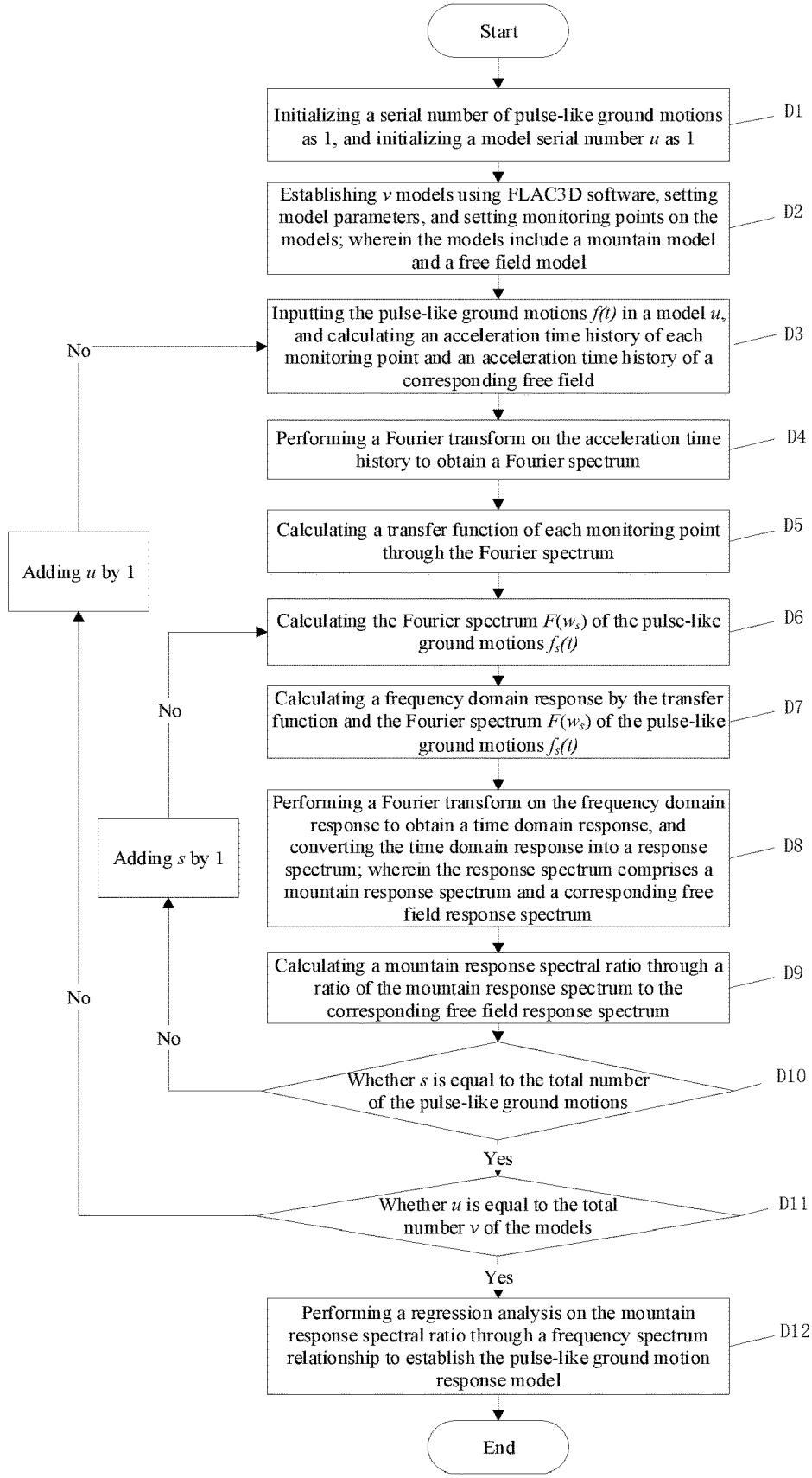
FIG. 6 is a flow chart of establishing the pulse-like ground motion response model in the present invention.

As shown in FIG. 6, a method of establishing the pulse-like ground motion response model includes:

D1: A serial numbers of pulse-like ground motions is initialized as 1, and a model serial number u is initialized as 1.

D2: v models are established using Fast Lagrangian Analysis of Continua in 3 Dimensions (FLAC3D) software, model parameters are set, and monitoring points are set on the models.

The models include a mountain model and a free field model, and the model parameters include a material cohesion and an internal friction angle.

D3: The pulse-like ground motions f(t) is input in a model u, and an acceleration time history of each monitoring point and an acceleration time history of the corresponding free field are calculated, respectively, wherein u=1, 2, 3 . . . v.

D4: A Fourier transform is performed on the acceleration time history to obtain a Fourier spectrum.

D5: A transfer function of each monitoring point is calculated through the Fourier spectrum.

The transfer function is calculated by the following formula:

$$H(w, z_r) = G(w, z_r)/F(w);$$

where, $H(w, z_r)$ represents the transfer function, and $G(w, z_r)$ and $F(w)$ both represent the Fourier spectrum.

D6: A Fourier spectrum $F(w_s)$ of the pulse-like ground motions $f_s(t)$ is calculated.

D7: A frequency domain response is calculated by the transfer function and the Fourier spectrum $F(w_s)$ of the pulse-like ground motions $f_s(t)$.

The frequency domain response is calculated by the following formula:

$$G(w_s, z_r) = H(w, z_r) * F(w_s);$$

where, $G(w_s, z_r)$ represents the frequency domain response, $H(w, z_r)$ represents the transfer function, $F(w_s)$ represents the Fourier spectrum corresponding to the pulse-like ground motions $f_s(t)$.

D8: A Fourier transform is performed on the frequency domain response to obtain a time domain response, and the time domain response is converted into a response spectrum.

The response spectrum includes a mountain response spectrum and a corresponding free field response spectrum.

D9: A mountain response spectral ratio is calculated through a ratio of the mountain response spectrum to the corresponding free field response spectrum.

D10: It is determined that whether s is equal to the total number of the pulse-like ground motions, proceeding to step D11 if yes, otherwise, s is added by 1, and returning to step D6.

D11: It is determined that whether u is equal to the total number v of the models, proceeding to step D12 if yes, otherwise, u is added by 1, and returning to step D3.

D12: A regression analysis is performed on the mountain response spectral ratio through a frequency spectrum relationship to establish the pulse-like ground motion response model.

The frequency spectrum relationship is expressed as follows:

$$y = c_0 + c_1 x_1 + c_2 x_2 + c_3 x_3 + \ldots + c_k x_k + \varepsilon;$$

where, y represents the mountain response spectral ratio, $x_1, x_2, x_3, \ldots, x_k$ all represent variables, $c_0, c_1, c_2, c_3, \ldots, c_k$ all represent variable coefficients, and represents a constant.

The pulse-like ground motion response model is specifically expressed as follows:

$$\ln(A_{v1}) = c_0 + c_1 \ln(T) + c_2 [\ln(T)]^2 + c_3 \theta + c_4 A_0$$

$$\ln(y_{v,s}) = c_1 M_{wv,s} + c_2 \ln(r_{v,s}) + c_3 x_{v,s} + c_4 \ln(T_v + c_{sc}) + c_5 [\ln(T_v + c_{sc})]^2 + c_6 \psi + c_7 \psi^2 + c_8 A_{0v} + c_9 \theta_v + c_{10} \ln(T_v) + c_k + \zeta$$

where, $\ln(y_{v,s})$ represents a magnification ratio of the response spectrum of the model v under the pulse earthquake record s, $A_{v1}$ represents an average spectral ratio, T represents a natural vibration period, $\theta$ represents a mountain inclination, $A_0$ represents a width of the mountain top, $r_{v,s}$ represents a function of an earthquake magnitude and a hypocentral distance, $\ln(r_{v,s}) = \ln(x_{v,s} + \exp(c_1 + c_2 M_{wv,s}))$, $x_{v,s}$ represents a hypocentral distance of the model v under the pulse earthquake record s, $M_{wv,s}$ represents the earthquake magnitude of the model v under the pulse earthquake record s, $T_v$ represents a natural vibration period of the model v, $A_{0v}$ represents a width of the mountain top of the model v, $\theta_v$ represents a mountain inclination of the model v, $c_{sc}$ represents a constant for controlling a near-field response spectrum, $\psi$ represents a height ratio of a measured point to the mountain, and $\zeta$ represents a model residual including a residual caused by different pulse earthquake records and a residual caused by the model parameters.

The natural vibration period T is calculated by the following formula:

$$T = \frac{4H}{f_\alpha \cdot C_s};$$

where, H represents a mountain height, $f_\alpha$ represents a correction coefficient, $f_\alpha=1.5309-1/(0.69\alpha+1.8836)$, $\alpha$ is a parameter representing a degree of the mountain inclination, $\alpha=2H \cot\theta/A_0$, and $C_s$ represents a shear wave velocity.

C6: The frequency domain value of the fault unit is converted into a time domain value using an inverse Fourier transform method, and an acceleration value is calculated by accumulating the time domain values.

The time domain value is calculated by the following formula:

$$a_{ij}(t) = \int_{-\infty}^{+\infty} A_{ij}(f)e^{-i2\pi ft}df;$$

where, $a_{ij}(t)$ represents the time domain value, $A_{ij}(f)$ represents the frequency domain value of the fault unit, f represents the input pulse-like ground motions, and t represents time.

The acceleration value is calculated by the following formula:

$$a(t) = \sum_{i=1}^{n_l}\sum_{j=1}^{n_w} a_{ij}(t+\Delta t_{ij});$$

where, a(t) represents the acceleration value, $\Delta t_{ij}$ represents a time interval between adjacent units.

C7: It is determined that whether j is less than $n_w$, proceeding to step C8 if yes, otherwise, j is added by 1, and returning to step C1.

C8: It is determined that whether i is less than $n_l$, if yes, the acceleration value of each fault unit is output and used as the simulated ground motions, otherwise, i is added by 1, and returning to step C1.

A4: A statistical relationship between the permanent displacement and landslide probability is obtained according to permanent displacement data, wherein the permanent displacement data is derived from historical earthquake-induced landslides and historical strong earthquake records.

A5: Earthquake-induced landslide probability is predicted according to the slope permanent displacement and the statistical relationship between the permanent displacement and the landslide probability, and the earthquake-induced landslide hazard is quantitatively evaluated through the earthquake-induced landslide probability.

What is claimed is:

1. A mechanical-model based earthquake-induced landslide hazard assessment method in an earthquake-prone mountainous area, comprising the following steps:

A1, obtaining a cohesion and an internal friction angle through a geological map of the earthquake-prone mountainous area and a geotechnical physical parameter;

A2, obtaining simulated ground motions by combining a pulse-like ground motion effect model and a pulse-like ground motion response model, wherein the pulse-like ground motion effect model is based on a fault and a seismic source, and the pulse-like ground motion response model is based on a mountain terrain effect;

A3, calculating a slope permanent displacement according to the simulated ground motions, the cohesion, the internal friction angle and parameters;

A4, obtaining a statistical relationship between the slope permanent displacement and a landslide probability according to permanent displacement data, wherein the permanent displacement data is derived from historical earthquake-induced landslides and historical earthquake records; and A5, predicting an earthquake-induced landslide probability according to the slope permanent displacement and the statistical relationship between the slope permanent displacement and the landslide probability, and quantitatively evaluating an earthquake-induced landslide hazard through the earthquake-induced landslide probability;

wherein, a method of calculating the slope permanent displacement in step A3 specifically comprises:

B1, calculating a component of a seismic acceleration along an inclined plane, a critical acceleration of a sliding block upward along the inclined plane and a critical acceleration of the sliding block downward along the inclined plane through model parameters of the sliding block, the simulated ground motions and excitation applied manners;

B2, determining whether a load acts on the sliding block, if the load acts on the sliding block, proceeding to step B3; if the load does not act on the sliding block, proceeding to step B4;

B3, calculating an acceleration of the sliding block in an $n^{th}$ step through the component of the seismic acceleration along the inclined plane, the critical acceleration of the sliding block upward along the inclined plane, the critical acceleration of the sliding block downward along the inclined plane and an initial velocity of the sliding block, calculating a displacement of the sliding block through the acceleration of the sliding block in the $n^{th}$ step, using the displacement of the sliding block in the $n^{th}$ step as the slope permanent displacement, and proceeding to step B6;

setting an initial value of n as 1;

B4, calculating the acceleration of the sliding block in the $n^{th}$ step through the component of the seismic acceleration along the inclined plane, the critical acceleration of the sliding block upward along the inclined plane, the critical acceleration of the sliding block downward along the inclined plane, the initial velocity of the sliding block and an initial velocity of a base, calculating the displacement of the sliding block in the $n^{th}$ step through the acceleration of the sliding block in the $n^{th}$ step, calculating a displacement of the base through an acceleration of the base, and proceeding to step B5;

B5, calculating a relative displacement through the displacement of the base and the displacement of the sliding block in the $n^{th}$ step, using the relative displacement as the slope permanent displacement, and proceeding to step B6; and B6, determining whether n is equal to a threshold value, if n is equal to the threshold value, outputting the slope permanent displacement if n is not equal to the threshold value, adding n by 1, and returning to step B1.

2. The mechanical-model based earthquake-induced landslide hazard assessment method in the earthquake-prone mountainous area of claim 1, wherein, the parameters in step A3 comprise a slope gradient, a slope aspect, and a water level.

3. The mechanical-model based earthquake-induced landslide hazard assessment method in the earthquake-prone mountainous area of claim 1, wherein, step B3 specifically comprises:

B31, setting the initial velocity $v_{(S)(0)}$ of the sliding block as 0;

B32, determining whether a velocity $v_{(S)(n-1)}$ of the sliding block is 0, if the velocity $v_{(S)(n-1)}$ of the sliding block is 0, proceeding to step B33; if the velocity $v_{(S)(n-1)}$ of the sliding block is not 0, proceeding to step B38;

B33, determining whether the component $a_{para(n)}$ of the seismic acceleration along the inclined plane is greater than the critical acceleration $a_{c-down(n)}$ of the sliding block downward along the inclined plane, if the component $a_{para(n)}$ of the seismic acceleration along the inclined plane is greater than the critical acceleration $a_{c-down(n)}$ of the sliding block downward along the inclined plane, proceeding to step B34; if the component $a_{para(n)}$ of the seismic acceleration along the inclined plane is less than or equal to the critical acceleration $a_{c-down(n)}$ of the sliding block downward along the inclined plane, proceeding to step B35;

B34, setting the acceleration $a_{(S)(n)}$ of the sliding block to be equal to the component $a_{para(n)}$ of the seismic acceleration along the inclined plane minus the critical acceleration $a_{c-down(n)}$ of the sliding block downward along the inclined plane, and proceeding to step B310;

B35, determining whether the component $a_{para(n)}$ of the seismic acceleration along the inclined plane is less than the critical acceleration $a_{c-up(n)}$ of the sliding block upward along the inclined plane, if the component $a_{para(n)}$ of the seismic acceleration along the inclined plane is less than the critical acceleration $a_{c-up(n)}$ of the sliding block upward along the inclined plane, proceeding to step B36; if the component $a_{para(n)}$ of the seismic acceleration along the inclined plane is greater than or equal to the critical acceleration $a_{c-up(n)}$ of the sliding block upward along the inclined plane, proceeding to step B37;

B36, setting the acceleration $a_{(S)(n)}$ of the sliding block to be equal to the component $a_{para(n)}$ of the seismic acceleration along the inclined plane minus the critical acceleration $a_{c-up(n)}$ of the sliding block upward along the inclined plane, and proceeding to step B310;

B37, setting the acceleration $a_{(S)(n)}$ of the sliding block to be equal to 0, and proceeding to step B310;

B38, determining whether the velocity $v_{(S)(n-1)}$ of the sliding block is greater than 0, if the velocity $v_{(S)(n-1)}$ of the sliding block is greater than 0, setting the acceleration $a_{(S)(n)}$ of the sliding block to be equal to the component $a_{para(n)}$ of the seismic acceleration along the inclined plane minus the critical acceleration $a_{c-down(n)}$ of the sliding block downward along the inclined plane, and proceeding to step B310; if the velocity $v_{(S)(n-1)}$ of the sliding block is less than or equal to 0, proceeding to step B39;

B39, setting the acceleration $a_{(S)(n)}$ of the sliding block to be equal to the component $a_{para(n)}$ of the seismic acceleration along the inclined plane minus the critical acceleration $a_{c-up(n)}$ of the sliding block upward along the inclined plane, and proceeding to step B310; and B310, calculating the displacement $d_{(S)(n)}$ of the sliding block in the $n^{th}$ step through the acceleration $a_{(S)(n)}$ of the sliding block in the $n^{th}$ step, and using the displacement $d_{(S)(n)}$ of the sliding block in the $n^{th}$ step as the slope permanent displacement.

4. The mechanical-model based earthquake-induced landslide hazard assessment method in the earthquake-prone mountainous area of claim 3, wherein, the displacement $d_{(S)(n)}$ of the sliding block in the $n^{th}$ step in step B310 is calculated by the following formula:

$$d_{(S)(n)} = d_{(S)(n-1)} + v_{(S)(n-1)} * \Delta t + \tfrac{1}{2} a_{(S)(n)}^2 * \Delta t;$$

wherein, $d_{(S)(n-1)}$ represents a displacement of the sliding block in an $(n-1)^{th}$ step, $v_{(S)(n-1)}$ represents a velocity of the sliding block in the $(n-1)^{th}$ step, $a_{(S)(n)}$ represents the acceleration of the sliding block in the $n^{th}$ step, and $\Delta t$ represents a time interval;

the velocity $v_{(S)(n-1)}$ of the sliding block in the $(n-1)^{th}$ step is calculated by the following formula:

$$v_{(S)(n-1)} = v_{(S)(n-2)} + a_{(S)(n-1)} * \Delta t;$$

wherein, $v_{(S)(n-2)}$ represents a velocity of the sliding block in an $(n-2)^{th}$ step, $a_{(S)(n-1)}$ represents an acceleration of the sliding block in the $(n-1)^{th}$ step, and $\Delta t$ represents the time interval.

5. The mechanical-model based earthquake-induced landslide hazard assessment method in the earthquake-prone mountainous area of claim 1, wherein, step B4 specifically comprises the following steps:

B41, setting both the initial velocity $v_{(S)(0)}$ of the sliding block and the initial velocity $v_{(B)(0)}$ of the base as 0;

B42, determining whether the velocity $v_{(S)(n-1)}$ of the sliding block in an $(n-1)^{th}$ step is equal to a velocity $v_{(B)(n-1)}$ of the base in the $(n-1)^{th}$ step, if the velocity $v_{(S)(n-1)}$ of the sliding block in the $(n-1)^{th}$ step is equal to the velocity $v_{(B)(n-1)}$ of the base in the $(n-1)^{th}$ step, proceeding to step B43; if the velocity $v_{(S)(n-1)}$ of the sliding block in the $(n-1)^{th}$ step is not equal to the velocity $v_{(B)(n-1)}$ of the base in the $(n-1)^{th}$ step, proceeding to step B48;

B43, determining whether the component $a_{para(n)}$ of the seismic acceleration along the inclined plane is less than the critical acceleration $a_{c-down(n)}$ of the sliding block downward along the inclined plane, if the component $a_{para(n)}$ of the seismic acceleration along the inclined plane is less than the critical acceleration $a_{c-down(n)}$ of the sliding block downward along the inclined plane, proceeding to step B44; if the component $a_{para(n)}$ of the seismic acceleration along the inclined plane is greater than or equal to the critical acceleration $a_{c-down(n)}$ of the sliding block downward along the inclined plane, proceeding to step B45;

B44, setting the acceleration $a_{(S)(n)}$ of the sliding block in the $n^{th}$ step to be equal to the critical acceleration $a_{c-down(n)}$ of the sliding block downward along the inclined plane, and proceeding to step B410;

B45, determining whether the component $a_{para(n)}$ of the seismic acceleration along the inclined plane is greater than the critical acceleration $a_{c-up(n)}$ of the sliding block upward along the inclined plane, if the component $a_{para(n)}$ of the seismic acceleration along the inclined plane is greater than the critical acceleration $a_{c-up(n)}$ of the sliding block upward along the inclined plane, proceeding to step B46; if the component $a_{para(n)}$ of the seismic acceleration along the inclined plane is less than or equal to the critical acceleration $a_{c\text{-}up(n)}$ of the sliding block upward along the inclined plane, proceeding to step B47;

B46, setting the acceleration $a_{(S)(n)}$ of the sliding block to be equal to the critical acceleration $a_{c\text{-}up(n)}$ of the sliding block upward along the inclined plane, and proceeding to step B410;

B47, setting the acceleration $a_{(S)(n)}$ of the sliding block to be equal to 0, and proceeding to step B410;

B48, determining whether the velocity $v_{(S)(n-1)}$ of the sliding block in the $(n-1)^{th}$ step is greater than the velocity $v_{(B)(n-1)}$ of the base in the $(n-1)^{th}$ step, if the velocity $v_{(S)(n-1)}$ of the sliding block in the $(n-1)^{th}$ step is greater than the velocity $v_{(B)(n-1)}$ of the base in the $(n-1)^{th}$ step, setting the acceleration $a_{(S)(n)}$ of the sliding block to be equal to the critical acceleration $a_{c\text{-}down(n)}$ of the sliding block downward along the inclined plane, and proceeding to step B410; if the velocity $v_{(S)(n-1)}$ of the sliding block in the $(n-1)^{th}$ step is less than or equal to the velocity $v_{(B)(n-1)}$ of the base in the $(n-1)^{th}$ step, proceeding to step B49;

B49, setting the acceleration $a_{(S)(n)}$ of the sliding block to be equal to the critical acceleration $a_{c\text{-}up(n)}$ of the sliding block upward along the inclined plane, and proceeding to step B410; and B410, calculating the displacement $d_{(S)(n)}$ of the sliding block in the $n^{th}$ step and the displacement $d_{(B)(n)}$ of the base in the $n^{th}$ step through the acceleration $a_{(S)(n)}$ of the sliding block in the $n^{th}$ step and the acceleration $a_{(B)(n)}$ of the base in the $n^{th}$ step.

6. The mechanical-model based earthquake-induced landslide hazard assessment method in the earthquake-prone mountainous area of claim 5, wherein, the displacement $d_{(S)(n)}$ of the sliding block in the $n^{th}$ step in step B410 is calculated by the following formula:

$$d_{(S)(n)} = d_{(S)(n-1)} + v_{(S)(n-1)} * \Delta t + \tfrac{1}{2} a_{(S)(n)} * \Delta t;$$

wherein, $d_{(S)(n-1)}$ represents a displacement of the sliding block in the $(n-1)^{th}$ step, $v_{(S)(n-1)}$ represents the velocity of the sliding block in the $(n-1)^{th}$ step, $a_{(S)(n)}$ represents the acceleration of the sliding block in the $n^{th}$ step, and $\Delta t$ represents a time interval;

the velocity $v_{(S)(n-1)}$ of the sliding block in the $(n-1)^{th}$ step is calculated by the following formula:

$$v_{(S)(n-1)} = v_{(S)(n-2)} + a_{(S)(n-1)} * \Delta t;$$

wherein, $v_{(S)(n-2)}$ represents a velocity of the sliding block in an $(n-2)^{th}$ step, $a_{(S)(n-1)}$ represents an acceleration of the sliding block in the $(n-1)^{th}$ step, and $\Delta t$ represents the time interval;

the displacement $d_{(B)(n)}$ of the base in the $n^{th}$ step is calculated by the following formula:

$$d_{(B)(n)} = d_{(B)(n-1)} + v_{(B)(n-1)} * \Delta t + \tfrac{1}{2} a_{(B)(n)}^2 * \Delta t;$$

wherein, $d_{(B)(n-1)}$ represents a displacement of the base in the $(n-1)^{th}$ step, $v_{(B)(n-1)}$ represents a velocity of the base in the $(n-1)^{th}$ step, $a_{(S)(n)}$ represents the acceleration of the sliding block in the $n^{th}$ step, and $\Delta t$ represents the time interval;

the velocity $v_{(B)(n-1)}$ of the base in the $(n-1)^{th}$ step is calculated by the following formula:

$$v_{(B)(n-1)} = v_{(B)(n-2)} + a_{(B)(n-1)} * \Delta t;$$

wherein, $v_{(B)(n-2)}$ represents a velocity of the base in the $(n-2)^{th}$ step, $a_{(B)(n-1)}$ represents an acceleration of the base in the $(n-1)^{th}$ step, and $\Delta t$ represents the time interval; and the acceleration $a_{(B)(n-1)}$ of the base in the $(n-1)^{th}$ step is calculated by the following formula:

$$a_{(B)(n-1)} = a_{(h)(n-1)};$$

wherein, $a_{(h)(n-1)}$ represents a component of a horizontal ground motion in the $(n-1)^{th}$ step.

7. A mechanical-model based earthquake-induced landslide hazard assessment method in an earthquake-prone mountainous area, comprising the following steps:

A1, obtaining a cohesion and an internal friction angle through a geological map of the earthquake-prone mountainous area and a geotechnical physical parameter;

A2, obtaining simulated ground motions by combining a pulse-like ground motion effect model and a pulse-like ground motion response model, wherein the pulse-like ground motion effect model is based on a fault and a seismic source, and the pulse-like ground motion response model is based on a mountain terrain effect;

A3, calculating a slope permanent displacement according to the simulated ground motions, the cohesion, the internal friction angle and parameters;

A4, obtaining a statistical relationship between the slope permanent displacement and a landslide probability according to permanent displacement data, wherein the permanent displacement data is derived from historical earthquake-induced landslides and historical earthquake records; and A5, predicting an earthquake-induced landslide probability according to the slope permanent displacement and the statistical relationship between the slope permanent displacement and the landslide probability, and quantitatively evaluating an earthquake-induced landslide hazard through the earthquake-induced landslide probability;

wherein, the simulated ground motions in step A3 are calculated by the following formula:

C1, creating a target fault, according to a requirement, dividing the target fault into $n_l$ longitudinal units in a longitudinal direction, dividing the target fault into $n_w$ transverse units in a transverse direction, and setting both an initial value of i and an initial value of j as 1, wherein i represents an ordinal number of each longitudinal unit of the $n_l$ longitudinal units, and j represents an ordinal number of each transverse unit of the $n_w$ transverse units;

C2, extracting geological information of the $n_l$ longitudinal units and the $n_w$ transverse units of the target fault; wherein the geological information comprises a unit sliding displacement;

C3, performing a statistical and regression analysis on records in a pulse-like ground motion database to obtain a pulse attenuation path effect model;

C4, performing a statistical analysis on historical seismic events in the earthquake-prone mountainous area based on a result of multi-scale potential seismic hazard zoning or setting a predetermined earthquake with a predetermined seismogenic fault and a predetermined earthquake magnitude, to obtain a pulse seismic source effect model;

C5, calculating a frequency domain value of the pulse seismic source effect model through the unit sliding displacement, and calculating a frequency domain value of each unit of the $n_l$ longitudinal units and the $n_w$ transverse units of the target fault through a frequency domain value of the pulse attenuation path effect model, the frequency domain value of the pulse seismic source effect model and a frequency domain value of the pulse-like ground motion response model;

C6, converting the frequency domain value of the each fault unit into a time domain value using an inverse Fourier transform method, and calculating an acceleration value by accumulating the time domain values;

C7, determining whether j is less than $n_w$, if j is less than $n_w$, proceeding to step C8; if j is greater than or equal to $n_w$, adding j by 1, and returning to the step C1; and C8, determining whether i is less than $n_f$, if i is less than $n_f$, outputting and using the acceleration value of each fault unit as the simulated ground motions; if i is greater than or equal to $n_f$, adding i by 1, and returning to step C1.

8. The mechanical-model based earthquake-induced landslide hazard assessment method in the earthquake-prone mountainous area of claim 7, wherein, a method of establishing the pulse-like ground motion response model in step C5 comprises:

D1, initializing a serial number of pulse-like ground motions as 1, and initializing a model serial number u as 1;

D2, establishing v models, setting model parameters, and setting a plurality of monitoring points on each of the v models; wherein the v models comprise a mountain model and a free field model;

D3, inputting the pulse-like ground motions f(t) in a model u of the v models, and calculating an acceleration time history of each monitoring point of the plurality of monitoring points and an acceleration time history of a free field corresponding to the each monitoring point, respectively, wherein u=1, 2, 3 ... v;

D4, performing a first Fourier transform on the acceleration time history of the each monitoring point and the acceleration time history of the free field to obtain a Fourier spectrum;

D5, calculating a transfer function of the each monitoring point through the Fourier spectrum;

D6, calculating the Fourier spectrum $F(w_s)$ of the pulse-like ground motions $f_s(t)$;

D7, calculating a frequency domain response by the transfer function and the Fourier spectrum $F(w_s)$ of the pulse-like ground motions $f_s(t)$;

D8, performing a second Fourier transform on the frequency domain response to obtain a time domain response, and converting the time domain response into a response spectrum; wherein the response spectrum comprises a mountain response spectrum and a free field response spectrum corresponding to the mountain response spectrum;

D9, calculating a mountain response spectral ratio through a ratio of the mountain response spectrum to the free field response spectrum;

D10, determining whether s is equal to a total number of the pulse-like ground motions, if s is equal to the total number of the pulse-like ground motions, proceeding to step D11; if s is not equal to the total number of the pulse-like ground motions, adding s by 1, and returning to the step D6;

D11, determining whether u is equal to a total number v of the v models, if u is equal to the total number v of the v models, proceeding to step D12; if u is not equal to the total number v of the v models, adding u by 1, and returning to step D3; and D12, performing a regression analysis on the mountain response spectral ratio through a frequency spectrum relationship to establish the pulse-like ground motion response model.

\* \* \* \* \*